(12) United States Patent
Chen

(10) Patent No.: US 7,455,615 B2
(45) Date of Patent: Nov. 25, 2008

(54) TRANSMISSION MECHANISM

(75) Inventor: Ting Kuang Chen, KeeLung (TW)

(73) Assignee: Hsin-Chih Chung Lee, Tao Yuan Hsien (TW)

( * ) Notice: Subject to any disclaimer, the term of this patent is extended or adjusted under 35 U.S.C. 154(b) by 198 days.

(21) Appl. No.: 11/619,702

(22) Filed: Jan. 4, 2007

(65) Prior Publication Data
US 2008/0167152 A1     Jul. 10, 2008

(51) Int. Cl.
*F16H 3/44* (2006.01)
(52) U.S. Cl. ...................................... 475/300
(58) Field of Classification Search ................. 475/300, 475/149, 298; 173/178, 216, 176, 48, 213, 173/217
See application file for complete search history.

(56) References Cited

U.S. PATENT DOCUMENTS 2,593,629 A * 4/1952 Swift .......................... 475/207
5,730,232 A * 3/1998 Mixer .......................... 173/176
6,076,438 A * 6/2000 Rahm ............................ 81/473
6,086,502 A * 7/2000 Chung ........................ 475/299
6,093,128 A * 7/2000 Seith ........................... 475/258
6,457,535 B1 * 10/2002 Tanaka ......................... 173/48
6,796,921 B1 * 9/2004 Buck et al. .................. 475/299
7,168,503 B1 * 1/2007 Teng ............................. 173/48

* cited by examiner

*Primary Examiner*—Thu Nguyen
*Assistant Examiner*—Erin D Bishop
(74) *Attorney, Agent, or Firm*—Rabin & Berdo, P.C.

(57) ABSTRACT

A transmission mechanism includes a motor, a first planetary gear set, a clutch connected with a sun gear, a second planetary gear set, a transmission shaft, an intermediate shaft and an output shaft. When the clutch is moved to the first position, the transmission shaft engages with the second planetary gear set and the output shaft, such that the power can be transmitted to the output shaft via the first planetary gear set, the second planetary gear set and the transmission shaft. When the clutch is moved to the second position, the transmission shaft disengages from the second planetary gear set and the output shaft, such that the power can be transmitted to the output shaft via the first planetary gear set, the second planetary gear set, the transmission shaft and the intermediate shaft.

1 Claim, 5 Drawing Sheets

TRANSMISSION MECHANISM

BACKGROUND OF THE INVENTION

1. Field of the Invention

The present invention generally relates to a power transmission mechanism for a power-driven tool.

2. The Prior Arts

A transmission mechanism of a conventional power-driven tool that is usually used for drilling or screw driving etc. can transmit the mechanical power from a motor to an output shaft via a gear system at various speed.

Referring to FIG. 4, the transmission mechanism of the conventional power-driven tool comprises a motor 1, a first planetary gear set 2, a second planetary gear set 3, a clutch 31, a connecting bar R, an intermediate shaft 5 and an output shaft 6, wherein the first planetary gear set 2 includes a first planet carrier 25 with a plurality of first planet gear shafts 251 extending therefrom and a plurality of first planet gears 23 respectively pivotally arranged on the first planet gear shafts 251, and a drive gear shaft 11 connected to the motor 1 is meshed with the first planetary gears 23. The first planet carrier 25 further has a clutch shaft 252 that is connected with the clutch 31. In addition, a circumferential groove 312 is formed on a rim of the clutch 31 for engaging with a switch (not shown) so that the clutch 31 moves with the switch. Furthermore, the second planetary gear set 3 includes a second planet carrier 35 and a plurality of second planet gears 34 pivotally connected to the second planet carrier 35, and the clutch 31 has two sun gears G1 and G2 connected thereto, wherein the first sun gear G1 is engaged with each second planet gears 34 and an internal gear 352 is formed on the second planet carrier 35 for meshing with the second sun gear G2. An end of the sun gear shaft having the first sun gear G1 and the second sun gear G2 arranged thereon is connected to an end of the intermediate shaft 5. The intermediate shaft 5 has a polygonal hole 5A. The connecting bar R is passed through the sun gear shaft and intermediate shaft 5, and has polygonal block R1 formed at one end thereof. An end of the output shaft 6 has a polygonal hole 61 corresponding to the polygonal block R1.

When the clutch 31 is axially moved to the first position (as shown in FIG. 4), the first sun gear G1 can be meshed with the second planet gear 34 and the polygonal block R1 received in the polygonal hole 5A of the intermediate shaft 5 is fitted into the polygonal hole 61 of the output shaft 6. Therefore, when the motor 1 drives the drive gear shaft 11 to rotate the first planetary gear set 2, the clutch shafts 252 of the first planetary gear set 2 drive the clutch 31 and the first sun gear G1 to rotate, the first sun gear G1 drives the second planetary gear set 3 to rotate, and then the second planet carrier 35 drives the intermediate shaft 5 and the output shaft 6 to rotate at low speed.

When the clutch 31 is axially moved to the second position (as shown in FIG. 5), the first sun gear G1 is disengaged from the second planet gear 34, the second sun gear G2 is engaged with the internal gear 352 of the second planet carrier 35, and the polygonal block R1 is disengaged from the polygonal hole 61 of the output shaft 6. When the motor 1 drives the drive gear shaft 11 to rotate the first planetary gear set 2, the clutch shafts 252 bring the clutch 31 and the second sun gear G2 to rotate, the second sun gear G2 brings the second planet carrier 35 to rotate, the second planet carrier 35 brings the intermediate shaft 5 to rotate at high speed and finally, the intermediate shaft 5 brings a part connected thereto to output the power.

SUMMARY OF THE INVENTION

The conventional transmission mechanism has two sun gears G1 and G2 respectively meshed with the second planet gears and the internal gear of the second planet carrier. Because the second planet gear and the second planet carrier rotate in opposite directions, the gear engagement is likely to interfere with each other when the speed of the rotational output is switched.

A primary objective of the present invention is to provide a transmission mechanism, which can solve the above-mentioned problem of gear interference when the output speed is switched.

To achieve the objective, the present invention comprises a motor, a first planetary gear set, a clutch with a sun gear, a second planetary gear set, a transmission shaft, an intermediate shaft and an output shaft. When the clutch is axially moved to the first position, the transmission shaft engages with the second planetary gear set and the output shaft. At this time the power can be transmitted from the motor to the output shaft via the first planetary gear set, the second planetary gear set, and the transmission shaft so as to perform low speed transmission. When the clutch is axially moved to the second position, the transmission shaft is disengaged from the second planetary gear set and the output shaft, so that then the power can be transmitted from motor to the output shaft via the first planetary gear set, the second planetary gear set, the transmission shaft, and the intermediate shaft to perform high speed transmission.

Accordingly, the motor has a drive gear shaft connected thereto. The first planetary gear set includes a first planet carrier and a plurality of first planet gears pivotally mounted on the first planet carrier for meshing with the drive gear shaft. The clutch having the sun gear mounted thereon is connected to the first planet carrier. The second planetary gear set includes a second planet carrier with an internal gear, a plurality of planet gears pivotally mounted on the second planet carrier for meshing with the sun gear. The transmission shaft has a round shaft formed at one end thereof for passing through a central hole of the sun gear, and a polygonal shaft formed at the other end thereof, in which a small gear is provided between the round shaft and the polygonal shaft. In addition, the intermediate shaft has an axial polygonal hole, in which the polygonal shaft of the transmission shaft is fitted into the polygonal hole of the intermediate shaft. Furthermore, the output shaft has a polygonal hole formed at an end corresponding to the polygonal shaft of the transmission shaft.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
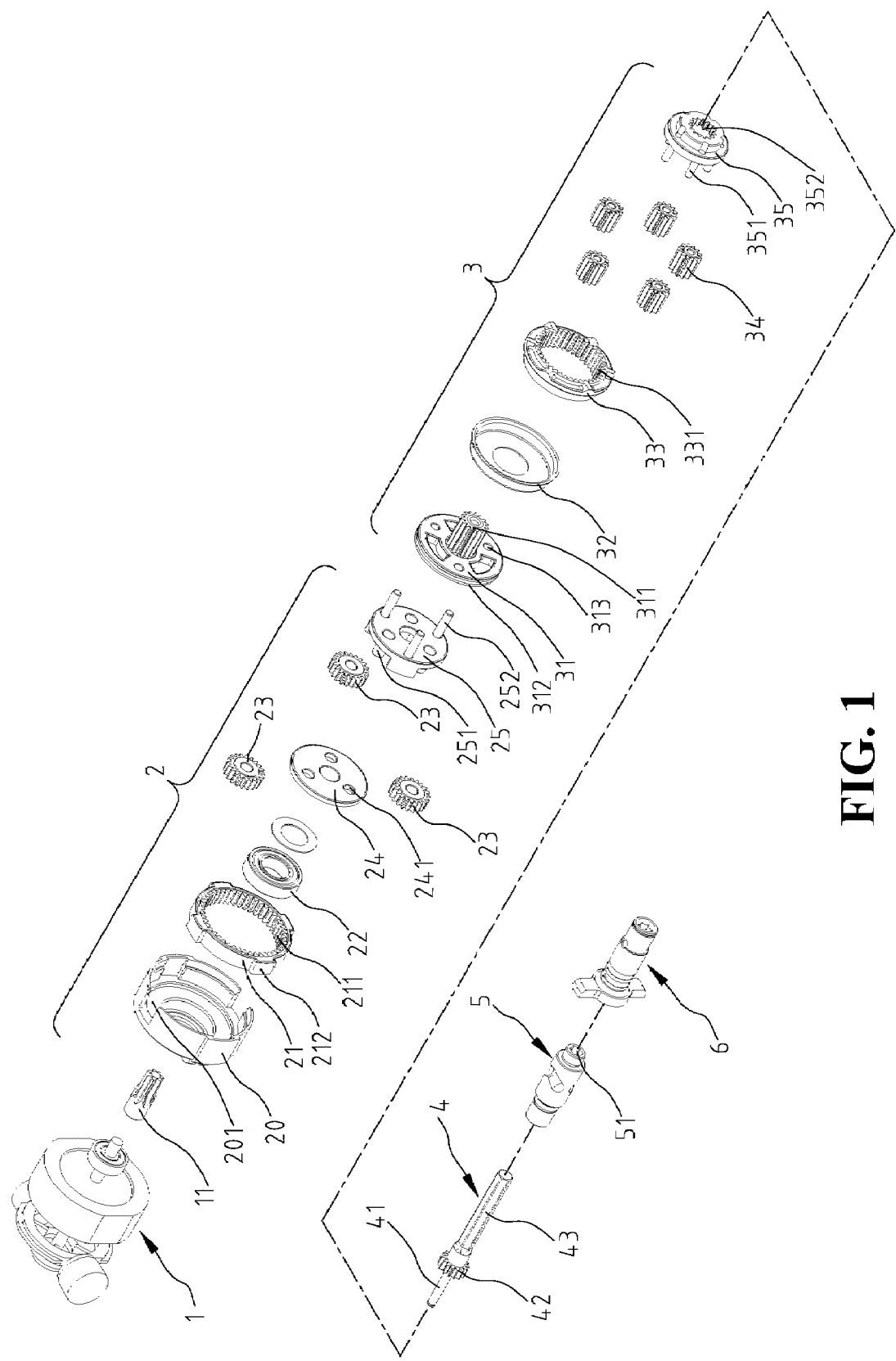
FIG. 1 is a perspective exploded view showing a transmission mechanism of the present invention.
Figure 2:
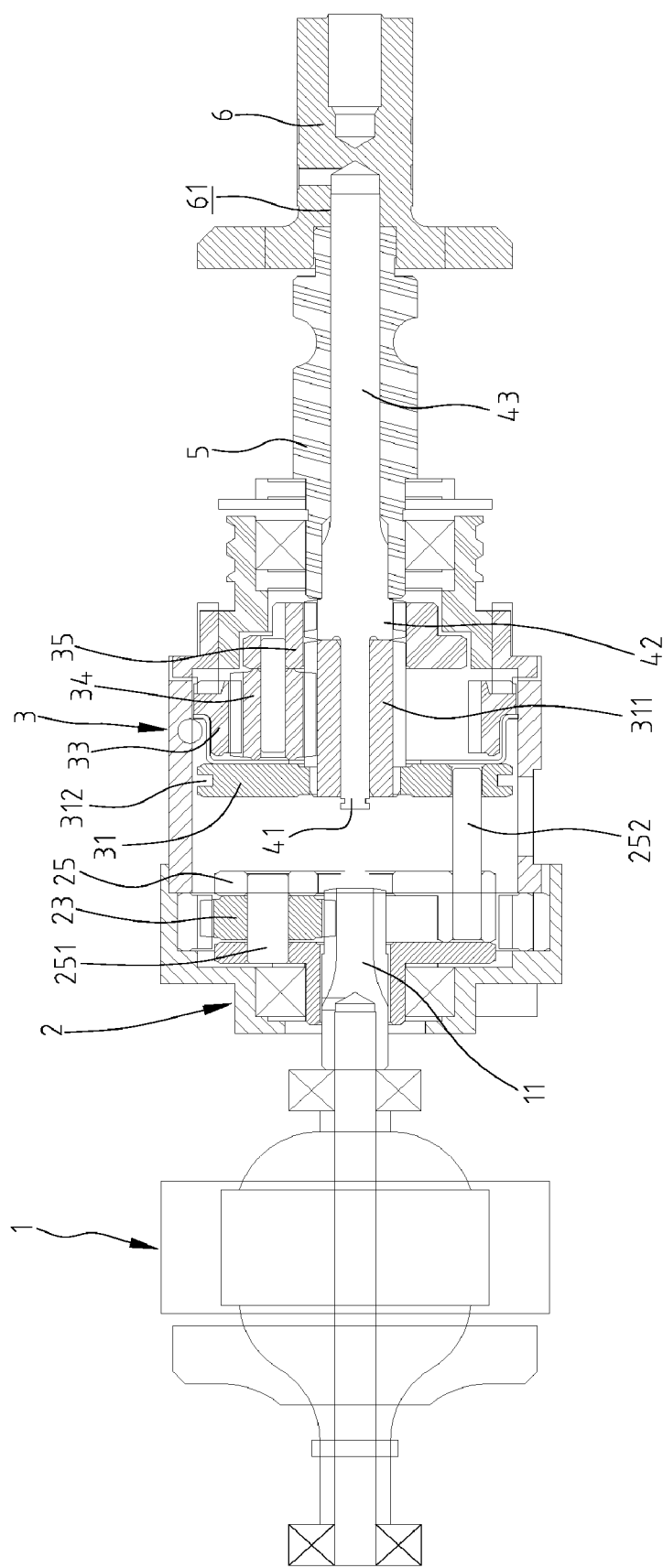
FIG. 2 is a cross sectional view showing an assembled transmission mechanism of the present invention in low-speed mode.

Referring to FIG. 1 and FIG. 2, a transmission mechanism in accordance with an embodiment of the present invention comprises a motor 1, a first planetary gear set 2, a second planetary gear set 3, a transmission shaft 4, an intermediate shaft 5 and an output shaft 6.

The motor 1 has a drive gear shaft 11 connected thereto, and the first planetary gear set 2 includes a shell 20 having notches 201 formed at the sidewall thereof, and a first ring gear 21 assembled within the shell 20 and having a plurality of inward-facing teeth 211 formed on an inner cylindrical surface thereof and a plurality of projections 212 formed on an outer cylindrical surface thereof. When the first ring gear 21 is assembled in the shell 20, the projections 212 engage with the notches 201 to prevent the relative rotation between the first ring gear 21 and the shell 20. Furthermore, a bearing 22 is disposed between the drive gear shaft 11 and the shell 20, and a first spacer 24 and a first planet carrier 25 are sleeved on the drive gear shaft 11. The first planet carrier 25 has a first side toward the motor 1 and a second side away from the motor 1, wherein a plurality of first planet gear shafts 251 are formed on the first side and a plurality of clutch shaft 252 are formed on the second side. Each first planet gear shaft 251 has a first planet gear 23 arranged thereon for meshing with the drive gear shaft 11 and the inward-facing teeth 211 of the first ring gear 21, and thereafter the first spacer 24 is connected to the first side of the first planet carrier 25 by passing the first planet gear shaft 251 through the spacer hole 241 of the first spacer 24.

The second planetary gear set 3 includes a clutch 31, a second planet carrier 35, a second ring gear 33 with inward-facing teeth 331, and a plurality of second planet gears 34, wherein the clutch 31 has a sun gear 311 axially extended therefrom, a plurality of through holes 313 formed thereon, and a circumferential groove 312 formed on a rim thereof for engaging with a switch (not shown). The second planet carrier 35 has an internal gear 352 formed at the center thereof and a plurality of second planet gear shafts 351 formed on a side thereof. Each of the second planet gear shafts has a second planet gear 34 arranged thereon for meshing with the sun gear 311 and the inward-facing teeth 331 of the second ring gear 33. Furthermore, a second spacer 32 is disposed between the second ring gear 33 and the clutch 31, and the clutch shafts 252 of the first planet carrier 25 pass through the through holes 313 of the clutch 31.

In one embodiment, the transmission shaft 4 has a round shaft 41 formed at one end thereof and a polygonal shaft 43 formed at the other end thereof, in which a small gear 42 is provided between the round shaft 41 and the polygonal shaft 43. When the round shaft 41 is inserted through the second planet carrier 35 and fit loosely into a center hole of the sun gear 311, the small gear 42 can be engaged with the internal gear 352 of the second planet carrier 35.

The intermediate shaft 5 has an axial extending polygonal hole 51.

The output shaft 6 has a polygonal hole 61 corresponding to the polygonal shaft 43. The polygonal shaft 43 of the transmission shaft 4 is inserted through the intermediate shaft 5 and then fitted into the polygonal hole 61 of the output shaft 6.

FIG. 2 shows that when the clutch 31 of the transmission mechanism in accordance with the present invention is moved axially to the first position by pushing the switch, the sun gear 311 is meshed with the second planet gear 34, the internal gear 352 of the second planet carrier 35 is meshed with the small gear 42 of the transmission shaft 4, and the polygonal shaft 43 of the transmission shaft 4 is fitted into the polygonal hole 61 of the output shaft 6. Therefore, the motor 1 drives the first planetary gear set 2 to rotate via the drive gear shaft 11; the clutch shafts 252 drive the clutch 31 and the sun gear 311 to rotate; the sun gear 311 drives the second planet gear 34 and the second planet carrier 35 to rotate; the second planet carrier 35 drives the transmission shaft 4 to rotate, and finally the transmission shaft 4 drives the output shaft 6 to rotate at low speed.

Figure 3:
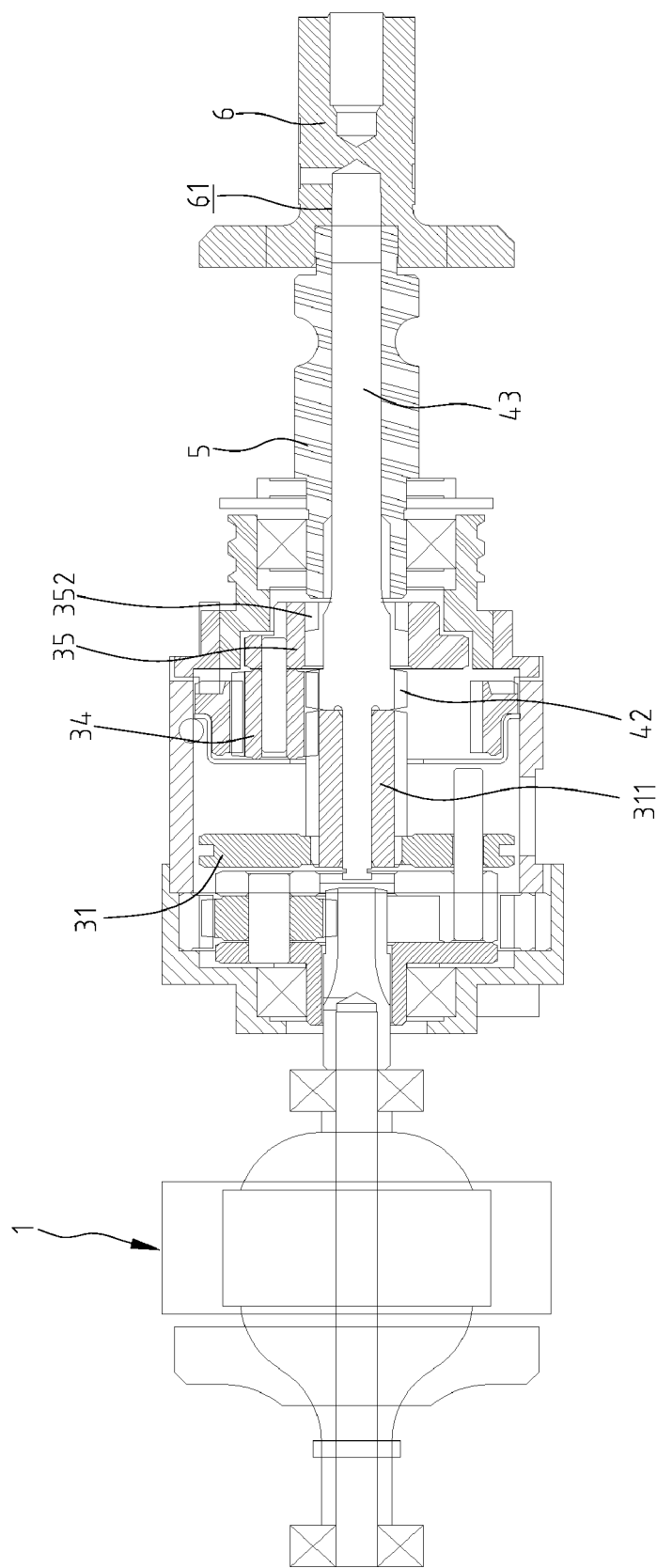
FIG. 3 is a cross sectional view showing a transmission mechanism of the present invention in high-speed mode.
Figure 4:
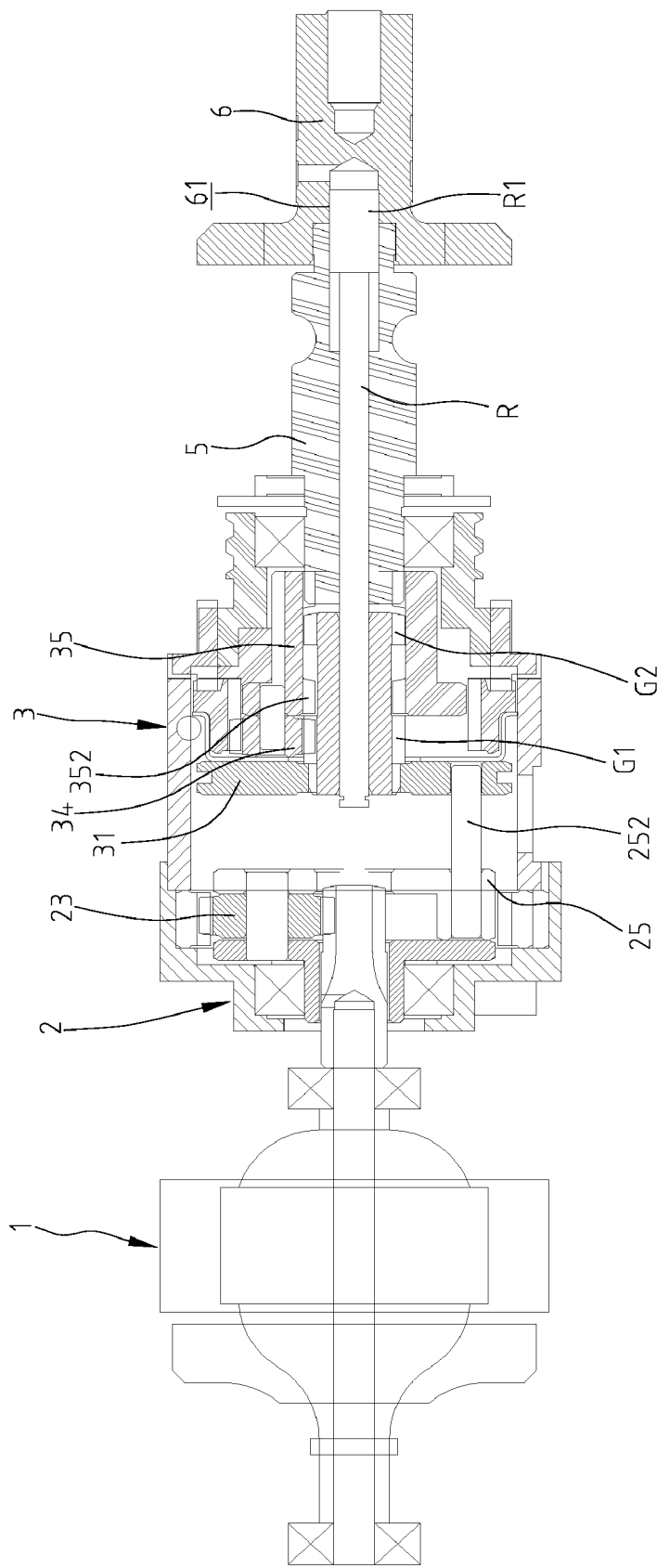
FIG. 4 is a cross sectional view showing a conventional transmission mechanism in low-speed mode.
Figure 5:
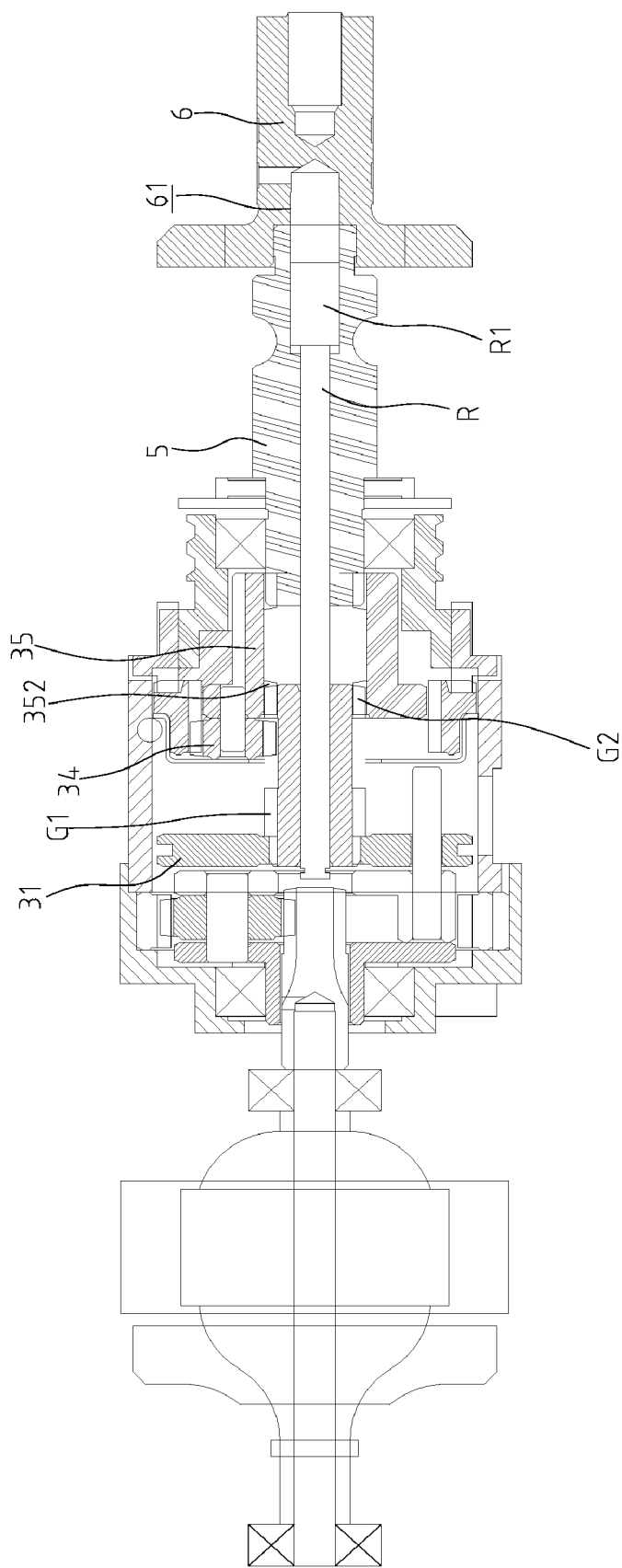
FIG. 5 is a cross sectional view showing a conventional transmission mechanism in high-speed mode.

As shown in FIG. 3, when the clutch 31 is moved to the second position by pushing the switch, the sun gear 311 is engaged with the second planet gear 34, the small gear 42 of the transmission shaft 4 is disengaged from the internal gear 352 of the second planet carrier 35, and the polygonal shaft 43 is disengaged with the polygonal hole 61 of the output shaft 6. Therefore, the motor 1 drives the first planetary gear set 2 to rotate via the drive gear shaft 11; the clutch shafts 252 drive the clutch 31 and the sun gear 311 to rotate; the sun gear 311 drives the second planet gear 34 to rotate; the second planet gear 34 drives the transmission shaft 4 to rotate, and the transmission shaft 4 drives the intermediate shaft 5 to rotate by means of the polygonal shaft 43, such that a part (not shown) connected to the intermediate shaft 5 can drive the output shaft to rotate to output the power.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A transmission mechanism, comprising:
   a motor;
   a first planetary gear set connected to the motor;
   a second planetary gear set connected to the first planetary gear set;
   a transmission shaft connected to the second planetary gear set;
   an intermediate shaft being inserted by the transmission shaft; and
   an output shaft being able to engage or disengage from the transmission shaft;
   wherein the second planetary gear set includes a second planet carrier with an internal gear, a plurality of second planet gears pivotally mounted on the second planet carrier, and a clutch connected to the first planetary gear set and having a sun gear meshed with the second planet gears;
   the transmission shaft has a round shaft formed at one end thereof for passing through a central hole of the sun gear, a polygonal shaft formed at the other end thereof, in which a small gear is provided between the round shaft and the polygonal shaft and is able to engage or disengage from the internal gear of the second planet carrier;
   the intermediate shaft has an axial polygonal hole, in which the polygonal shaft of the transmission shaft is fitted into the polygonal hole of the intermediate shaft; and
   the output shaft has a polygonal hole formed at one end corresponding to the polygonal shaft of the transmission shaft.

* * * * *